Sept. 10, 1968  A. MEERIK ET AL  3,400,786
FRICTION BRAKE FOR A TUBULAR MEMBER
Filed Nov. 28, 1966  2 Sheets-Sheet 1

INVENTORS
ALBERT MEERIK
HARTVIG SOE

BY *Larson and Taylor*

ATTORNEYS

Sept. 10, 1968  A. MEERIK ET AL  3,400,786
FRICTION BRAKE FOR A TUBULAR MEMBER
Filed Nov. 28, 1966  2 Sheets-Sheet 2

INVENTORS
ALBERT MEERIK
HARTVIG SOE

BY *Larson and Taylor*

ATTORNEYS

United States Patent Office 3,400,786
Patented Sept. 10, 1968

3,400,786
FRICTION BRAKE FOR A TUBULAR MEMBER
Albert Meerik, Alvsjo, and Hartvig Soe, Hagersten, Sweden, assignors to Misomex Aktiebolag, Hagersten, Sweden
Filed Nov. 28, 1966, Ser. No. 597,416
Claims priority, application Sweden, Dec. 2, 1965, 15,632/65
15 Claims. (Cl. 188—67)

ABSTRACT OF THE DISCLOSURE

A high precision brake for a longitudinally moving shaft. Two opposing members held in generally abutting relationship with each other for rocking movement about an axis have first recesses on one side of the rocking axis to encircle the shaft and an actuating means on the other side of the rocking axis. The actuating means includes an integral actuating plate in continuous abutting relationship with the first and second members and mounted for pivotal movement, when acted upon by a sufficient force, to urge the first two members apart thereby urging the first two members together on the opposite side of the rocking axis to engage the shaft.

---

This invention relates to a friction brake or the like for preventing movement of a moveable member, and in particular it relates to a friction brake, preferably for controlling movement of an elongated tube or shaft, which grips the moveable member in a positive and non-vibratory manner and which may be released therefrom without vibration of the elements of the brake.

The friction brake according to the present invention is relatively simple and thus it may be manufactured and installed quite economically. In addition the brake will require little or no service or adjustment. While the present invention may be employed to control movement of any moveable member, it has been designed to solve the specific problems encountered in locking a tube or shaft against longitudinal movement.

Known friction brakes for locking tubes or shafts against longitudinal relative movement generally include a fixed element and a moveable element which together surround the tube. To lock the tube against movement the moveable element is actuated, for example, by a wedge or an asymmetrically mounted control roller arranged to be pressed against the tube, as a result of which the moveable member is locked between the two elements of the brake. The wedge or the asymmetrically mounted roller may be actuated by manually operable means. However, in most applications the moveable element of the brake is actuated by a power driven means such as hydraulic or pneumatic servo motor.

In these known brakes it is necessary to employ levers, joints and other mechanical connections between the manual or power driving means and the moveable element of the brake. These mechanical elements must be moved between various positions for placing the brake into the operative condition to frictionally engage the moveable member. In such mechanical connections it is practically impossible to avoid a limited amount of dead movement in the coupling between the driving source and the moveable element of the brake. As a result of this dead movement the moveable element of the brake will undergo slight oscillating movement, which movement, even if very small, will cause the brake to vibrate or rock slightly before the brake has become completely affixed to the tube or shaft. Normally, such vibration would be of little or no importance. However, such vibration is of significant importance in high precision applications where a high degree of accuracy is paramount. For example, it may be necessary to lock a tube or shaft against longitudinal movement with an accuracy of a few hundredths or even a few thousandths of a millimeter. Such accuracy is not obtainable with the previously known brake devices which allow even slight vibration or rocking of the elements of the brake. In addition, with these known brakes the dead movement which occurs upon release of the tube or shaft from the brake will cause a slight lag in the releasing movement which will further reduce the accuracy of the device. Moreover, the rocking or vibratory movement will occur during release of the tube or shaft in the same manner as it occurs during frictional engagement of the tube or shaft.

Therefore, a need has arisen for a simple and effective brake, preferably for tubes or shafts, which will positively grip and effectively release a moveable element which brake will allow an even and non-vibrational engagement and release of the brake and which brake is completely free of dead movement or "play" between the driving means and the moveable element of the brake during the braking or release movement.

Thus, it is an object of this invention to provide a substantially improved friction brake which is greatly simplified in its design and construction but in which a high degree of accuracy has been obtained owing to the elimination of vibrational movements and dead movement of the brake element.

The brake according to the present invention includes two main clutch members mounted in opposing relationship to each other. The two members are connected together by resilient connecting means in such a manner that the members are capable of rocking movement relative to each other about an axis. On one side of this axis there is formed in each member a groove-like first recess. The two first recesses are arranged in opposing relationship to each other to surround the moveable element which is to be locked by the brake. These first recesses are so designed that they may be moved towards each other to grip the moveable element or separated from each other to allow movement of the moveable element.

The means for causing movement of the two first recesses towards each other are located on the side of the said axis opposite from the first recesses. This actuating means includes a second set of recesses, one in each clutch member, which are mounted in opposing relationship to each other to form an enclosed chamber. A moveable actuating plate is mounted with a portion within the said enclosed chamber and a portion extending between and in abutting relationship with both of the said clutch members at the ends thereof remote from the said axis. A pressure piston is also mounted within the chamber and is integrally connected to the said actuating plate. Means are provided for exerting a pressure force on the said piston so that the piston will cause pivotable movement of said actuating plate as a result of which the actuating plate will cause the ends of the clutch members remote from the said axis and adjacent the said chamber to move apart. This separating movement of the clutch members in the area of the said chamber will cause bending movement of the clutch members as a result of which the members will rock about the said axis and the two first recesses will move towards each other to frictionally engage the moveable element to prevent movement thereof.

In a preferred form of the invention resilient means are employed to urge the portions of the clutch members adjacent the chamber towards each other to offset the said pressure force. Also, the means for connecting the two clutch members together should be strong. However, they must include sufficient resiliency to allow the said rocking movement of the members.

Thus, it is an object of this invention to provide an improved frictional braking device which overcomes many disadvantages of previously known braking devices.

It is another object of this invention to provide a frictional brake which is relatively simple in its construction but which provides a positive frictional grip while eliminating vibratory and rocking movement of the braking elements and which eliminates dead movement between the driving means and the elements of the brake.

It is another object of this invention to provide an improved frictional brake having a first set of recesses for frictionally engaging a moveable element and a second set of recesses for providing actuation of the brake wherein actuation of the brake is caused by a rocking movement of the brake about an axis located between the first set of recesses and the second set of recesses.

Other objects and the attendant advantages of the present invention will become apparent from the detailed description to follow together with the attached drawings which describe and illustrate a preferred embodiment of the invention. However it is to be understood that the invention is not limited to the forms of execution so described and shown.

Figure 1:
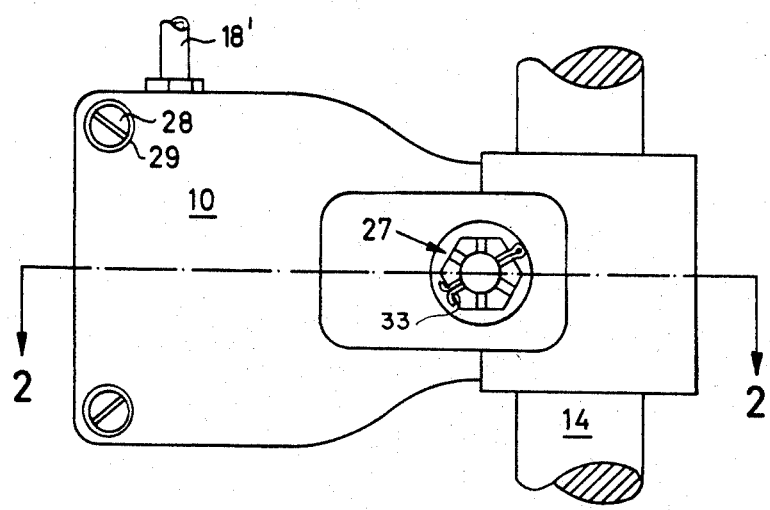
FIGURE 1 is a plan view of a preferred embodiment of the invention.

According to the embodiment of the invention as shown in the drawings there are provided two main outer casing members, or clutch members 10 and 11. These members may be made from any suitable material such as, for example, pig iron. For purposes of convenience the clutch member 10 will be referred to as the upper clutch member and the clutch member 11 as the lower clutch member. It is of course apparent, however, that the orientation of the device need not be as shown in the drawings.

Figure 4:
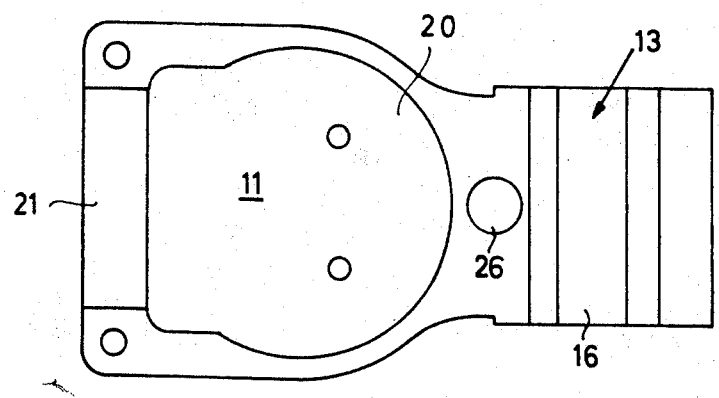
FIGURE 4 is a plan view of the lower brake clutch element of the invention.

Each of the clutch members 10 and 11 are provided near one end with first recesses 12 and 13 respectively. The main portions of these recesses are substantially semi-cylindrical in shape wherein the radius of the semi-cylinder is substantially equal to the radius of a circular tube 14 the movement of which is to be controlled by the brake. The right-hand end of each clutch member 10 and 11 (as viewed in FIGURE 2) is cut away slightly to form a thin slot 32. By way of example it has been found that a slot thickness of 0.3 mm. is desirable when controlling a tube having a radius of 15 mm. Grooves 15 and 16 are formed in the uppermost portion of recess 12 and the lowermost portion of recess 13 respectively. See FIGURES 2 and 4. These grooves 15 and 16 which extend in a direction parallel to the axis of the semi-cylindrical first recesses 12 and 13 extend circumferentially for a sector of approximately 50° and have a radius of curvature which is approximately 75% of the radius of the remaining portions of the semi-cylindrical recesses 12 and 13. By way of example, in one embodiment the radius of curvature of grooves 15 and 16 is 11 mm. where the radius of the remaining semi-cylindrical portion is 15 mm.

Figure 2:
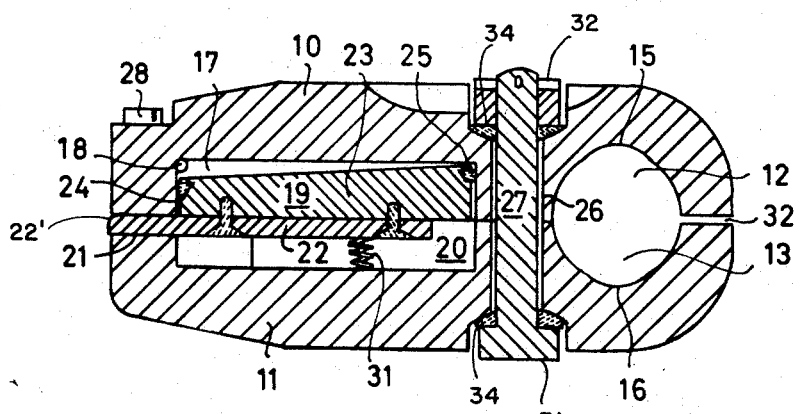
FIGURE 2 is a sectional view taken along the line 2—2 of FIGURE 1.

At the left-hand side of the brake (as shown in FIGURE 2) there is provided in the clutch member 10 a cylindrical recess 17, the axis of which runs perpendicular to the plane of contact between the two clutch members, and said cylindrical recess extends through a major portion of the upper clutch member 10. A pressure fluid opening 18 is provided in the uppermost portion of cylindrical recess 17 at a point close to the far left side of the recess, that is the side farthest removed from the first recess 12. Opening 18 is intended to permit pressure fluid to enter the recess 17 after passing through a pipe 18' from a source of pressure medium, such as, for example, an air compressor or a hydraulic pump. The cylindrical recess 17 should be of sufficient depth to allow movement therein of a piston member, which is to be described in greater detail below, for effectuating relative movement of the clutch members 10 and 11.

A recess 20 is provided in the lower clutch member 11. A major portion of this recess 20 is identical in cross-section to the upper recess 17 in the upper clutch member 10. However recess 20 includes a cut out portion substantially rectangular in shape and of the same depth as the remaining portion of the recess 20, said rectangular cut out portion being located at the end of the recess 20 remote from the first recess 13. The long side of this rectangular portion extends parallel to the axis of the semi-cylindrical first recesses 12 and 13. The lower clutch member 11 also includes a shallow cut out portion 21 which extends from the recess 20 to the end of the clutch member 11 remote from the first recess 13.

The two recesses 17 and 20 together form a chamber. An actuating means 19, which includes a piston 23 and an actuating plate 22 are mounted within the said chamber and adapted to act in response to fluid pressure to cause the two clutch members 10 and 11 to move apart. The two clutch members 10 and 11 are held together by a bolt 27 passing through bores 26 in clutch members 10 and 11 at a point between the first recesses 12 and 13 and the second recesses 17 and 20. Consequently, separation of the clutch members 10 and 11 in the area of the second recesses will cause a pivotable or rocking movement of the clutch members 10 and 11 about an axis located generally in the area of bolt 27 so that the recesses 12 and 13 move towards each other to frictionally engage the moveable member 14.

The actuating member 19 includes an actuating plate 22 which extends through the chamber formed by recesses 17 and 20 and into the cut out portion 21 whereat the upper and lower surfaces of the actuating plate 22 lie flat against portions of clutch members 10 and 11 respectively. The right-hand end of actuating plate 22 is spaced from the right-hand end of recess 20 so that the actuating plate 22 can move up and down freely within the said chamber. A piston member 23 is rigidly affixed to the actuating plate 22 between the said actuating plate and the pressure inlet 18. The piston may be attached to the actuating plate 22 by any suitable means such as screwing, riveting, welding or the like. This piston 23 is substantially cylindrical in cross-section and is adapted to fit snugly within the recess 17. The top of piston 23 slopes upwardly from left to right (as shown in FIGURE 2) so that the opening 18 will not be covered by the piston member 23 even when the piston member is in its uppermost position. An elliptical groove 24 circumvents the side of piston member 23 adjacent the top thereof and a sealing ring 25 is placed in this groove for sealing the space above the piston 23.

As noted above the two clutch members 10 and 11 are connected together in the area between the first recesses 12 and 13 and the second recesses 17 and 20. A vertically extending bore 26 extends completely through each of the two clutch members. A bolt 27, the diameter of which is slightly less than the diameter of bore 26, is inserted in the bore. One end of bolt 27 is enlarged as shown at 31 while a crown nut 32 is inserted on the bolt 27 at the opposite end thereof and held thereto by a cotter pin 33. The bores 26 are widened at their outer ends into a spherical form and partially spherical washers 34 of a suitably resilient material are placed between nut 32 and the clutch member 10 and between portion 31 and the clutch member 11. With this construction the two clutch members 10 and 11 may be rocked with a slight movement relative to each other about a rocking axis which is located at or in the vicinity of the bolt 27.

The clutch members 10 and 11 are also connected together by resilient means located at the end of the brake remote from the recesses 12 and 13.

Figure 3:
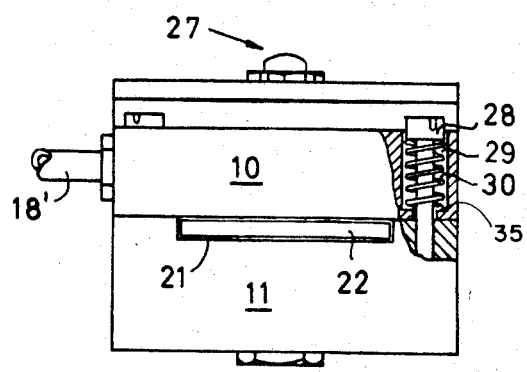
FIGURE 3 is a vertical elevation view of the brake as seen from one end.

Referring to FIGURE 3 there is shown a bolt 28 which passes through a bore 29 in clutch member 11 and which is threadedly engaged in clutch member 11. A spring 30 acts at its lower end on shoulders 35 formed in bore 29 and at its upper end against the head of the bolt 28. Consequently the spring 20 acts to urge the clutch members 10 and 11 together. Helical springs 31 are provided within the recess 20 for urging the actuating means 19 to its uppermost position. It can be seen that both springs 30 and springs 31 act in such a manner as to urge the clutch members 10 and 11 together.

In the absence of a pressure medium within the recess 17 above piston 23, the two clutch members 10 and 11 will be positioned evenly against each other so that only a small slot 32 will exist between the clutch members at the ends thereof to the right of recesses 12 and 13 as shown in FIGURE 2. This slot 32 should be of sufficient thickness so that a tube 14 can be locked rigidly within the tube holding first recesses 12 and 13 when the clutch members 10 and 11 are rocked into the tube locking position about the rocking axis at or in the immediate vicinity of the bolt 27. However, the slot 32 should be only as thick as is necessary to allow the required movement of recesses 12 and 13 towards each other so as to avoid an unnecessary and undesirable reduction in the area of the braking surface. In one form of the invention the slot 32 has a total thickness of 0.6 mm. in the brake disengaged position whereat the tube 14 may slip between the clutch members 10 and 11. However, even in this brake disengaged position the tube 14 will be well supported in the first recesses 12 and 13 since the clutch members will have little influence on movement of the tube 14 at this point since the clutch members 10 and 11 will be rigidly held in the brake disengaged position without the influence of the pressure force upon piston 23.

In connecting the clutch members together the bolt 27 should not be drawn any tighter than is necessary for locking the clutch members 10 and 11 together. This is so because the clutch members 10 and 11 must be left sufficient freedom to rock relative to each other for causing the first recesses 12 and 13 to approach each other to lock the tube 14 against movement relative to the brake. However, the bolt must be sufficiently tight so that unnecessary play between the two clutch members 10 and 11 is eliminated.

Also the screws 28 in the portion of the brake remote from the first recesses should be drawn tight enough that when the piston 23 is released from the pressure force and urged upwardly by spring 31 then the piston 23 will move to its uppermost position and the clutch members 10 and 11 will come together.

The invention operates in the following manner. Fluid under pressure is applied to the brake from a source, such as for example, an air compressor or a hydraulic pump. The fluid enters the recess 17 in the upper clutch member 10 through opening 18. The space above the piston 23 which is sealed by a sealing ring 25, is filled with the pressure fluid until the pressure above the piston exceeds the total force from the springs 30 and 31 at which time the piston moves downwardly. The actuating plate 22 is thereby subjected to a straining force within the cut out portion 21. The plate 22 will thereby be pivotally turned about its outermost edge downwardly into the lower recess 20 as its preferably rounded outer upper edge 22' presses the upper clutch member 10 away from the corresponding part of the lower clutch member 11. As the diameter of bolt 27 is smaller than that of the bore 26, the clutch members may be rocked about a rocking axis at or in the immediate vicinity of the bolt 27 in cooperation with the spherical widened portions adjacent the ends of the bore 26 and the partially spherical washers. Consequently, as the portions of the clutch members around the piston and chamber are rocked away from each other the tube holding first recesses 12 and 13 move closer to each other thereby pressing the tube 14 softly and with great precision. The locking force may be varied according to the need by increasing or decreasing the pressure of the medium acting on the piston 23.

To release the clutch members from the tube 14, the pressure in the chamber above the piston is lowered by allowing pressure fluid to escape from the opening 18 through line 18' and through a valve (not shown) to drain. The piston 23 then rises to its initial position under the influence of springs 30 and 31. Simultaneously the parts of the clutch members around the piston and chamber are brought back into contact with each other and recesses 12 and 13 separate to allow movement of the tube relative to the brake device.

The turning movement of the actuating plate 22, of course, can also be brought about by mechanical means rather than pneumatic or hydraulic means. Also a vacuum may be employed in place of the pressure fluid.

While the invention has been discussed above and a preferred embodiment has been illustrated and described in detail, it should be apparent that the invention is not limited by this specific description and is capable of numerous modifications and variations without departing from the spirit and scope of the invention as defined in the appended claims.

We claim:
1. A friction brake comprising: first and second opposed and generally abutting clutch members, each member having a first recess adapted to fit about a movable tubular element, the two members being mounted so that the said two first recesses are located on opposite sides of the said movable element in opposing relationship to each other, means for connecting the two members together for rocking movement about an axis spaced from the first recesses at least between a first position whereat the surfaces of the said first recesses frictionally engage the movable element and a second position whereat the surfaces of the said first recesses are spaced from the said movable element, an actuating means mounted to act upon the members on the side of said axis remote from said first recesses for urging the members apart and thereby urging the said first recesses towards each other to said first position, and resilient means also mounted to act upon the said members on the side of said axis remote from said first recesses for urging the members together thereby urging the first recesses apart to said second position, said actuating means including an actuating plate having substantially integral first and second portions, the first portion continuously abutting said first and second members in both said first and second positions, and the second portion positioned such that when acted upon by an actuating force the actuating plate acts as a lever to provide a mechanical advantage so that upon the application of a relatively small force the parts of the first portion continuously abutting the two members urge the same apart toward the second position by direct mechanical abutment with the two members.

2. A friction brake as claimed in claim 1 wherein each of said members includes a second recess, the two second recesses being located on the side of the said axis remote from said first recesses and in opposing relationship with each other to form a chamber, and said actuating means further including a piston mounted for reciprocatory movement in said chamber, wherein said plate is connected to said piston so that movement of the piston causes said pivotal movement of the said plate, and means for causing a pressure differential across said piston in said chamber for causing the piston to pivot the plate to rock the members to the said first position.

3. A friction brake as claimed in claim 2 wherein the portions of the said members on the side of the first recesses away from the said axis are spaced apart to form a slot when the members are in said second position.

4. A friction brake as claimed in claim 3 wherein the first recesses are substantially semi-cylindrical and the thickness of the slot is approximately 1% of the radius of the said semi-cylindrical recesses.

5. A friction brake as claimed in claim 2 including a means for holding the two members together in the vicinity of the said axis including aligned bores through each member, a bolt having a diameter less than said bore diameter and passing through said bores, enlarged flanges at the ends of said bolt to be tightened against said members to tighten the bolt in the bores and resilient elements between the flanges and the members.

6. A friction brake as claimed in claim 5 wherein the surfaces of said members surrounding the outer ends of the bores are substantially spherical and said resilient elements are partially spherical bearings.

7. A friction brake as claimed in claim 2 wherein said resilient means includes at least one screw member connecting the members together on the side of the chamber away from the axis and having a spring acting against the head of the screw to urge the members together.

8. A friction brake as claimed in claim 2 wherein said first recesses are each generally semi-cylindrical and thereby adapted to cooperate with a movable element which is a rotatable shaft having a circular cross-section, the surface of each said first recess including at least two portions of different radii of curvature, one portion having a radius of curvature substantially equal to that of the shaft to be controlled and the other portion having a smaller radius of curvature.

9. A friction brake as claimed in claim 8 wherein the longitudinal axes of the two portions are parallel and the said other portions are located in the deepest part of the recess and extend circumferentially for approximately 50°.

10. A friction brake as claimed in claim 8 wherein the radius of curvature of said other portion is approximately 75% of that of said one portion.

11. A friction brake as claimed in claim 2 wherein said actuating plate extends from said chamber into a groove formed between said members on the side of the chamber away from said axis, and said piston is mounted on one side of said plate.

12. A friction brake as claimed in claim 11 wherein said groove is formed in the member located on the side of said plate away from said piston.

13. A friction brake as claimed in claim 11 in which the side of the piston away from said plate is inclined away from said plate with the portion of the piston of least thickness being that side of the piston away from the axis and said means for causing a pressure differential including a fluid inlet in said chamber on the side thereof away from the axis adjacent the end of the chamber facing the inclined face of the piston.

14. A friction brake as claimed in claim 11 including resilient means in said chamber for urging the piston towards the end of the chamber facing the inclined face of the piston so that in the absence of a pressure force acting on the piston the piston will rest with its thickest portion against the end face of the chamber.

15. A friction brake comprising: first and second opposed and generally abutting clutch members, each member having a first recess adapted to fit about a moveable element, the two members being mounted so that the said two first recesses are located on opposite sides of the said moveable element in opposing relationship to each other, means for connecting the two members together for rocking movement about an axis spaced from the first recesses at least between a first position whereat the surfaces of the said first recesses frictionally engage the moveable element and a second position whereat the surfaces of the said first recesses are spaced from the said moveable element, an actuating means mounted to act upon the members on the side of said axis remote from said first recesses for urging the members apart and thereby urging the said first recesses towards each other to said first position, and resilient means also mounted to act upon the said members on the side of said axis remote from said first recesses for urging the members together thereby urging the first recesses apart to said second position, wherein said actuating means includes an actuating plate, said plate being mounted in abutting relationship with both said members and mounted for pivotal movement against the force of the resilient means to rock the members to the said first position, wherein each of said members includes a second recess, the two second recesses being located on the side of the said axis remote from said first recesses and in opposing relationship with each other to form a chamber, and said actuating means further including a piston mounted for reciprocatory movement in said chamber, wherein said plate is connected to said piston so that movement of the piston causes said pivotal movement of the said plate, and means for causing a pressure differential across said piston in said chamber for causing the piston to pivot the plate to rock the members to the said first position, wherein the portions of the said members on the side of the first recesses away from the said axis are spaced apart to form a slot when the members are in said second position, including a means for holding the two members together in the vicinity of the said axis including aligned bores through each member, a bolt having a diameter less than said bore diameter and passing through said bores, enlarged flanges at the ends of said bolt to be tightened against said members to tighten the bolt in the bores and resilient elements between the flanges and the members, wherein said resilient means includes at least one screw member connecting the members together on the side of the chamber away from the axis and having a spring acting against the head of the screw to urge the members together, wherein said first recesses are each generally semi-cylindrical and thereby adapted to cooperate with a moveable element which is a rotatable shaft having a circular cross-section, the surface of each said first recess including at least two portions of different radii of curvature, one portion having a radius of curvature substantially equal to that of the shaft to be controlled and the other portion having a smaller radius of curvature, wherein said actuating plate extends from said chamber into a groove formed between said members on the side of the chamber away from said axis, and said piston is mounted on one side of said plate.

References Cited

UNITED STATES PATENTS

| | | | |
|---|---|---|---|
| 2,115,083 | 4/1938 | Pierce | 188—152 XR |
| 3,295,636 | 1/1967 | Adams | 188—76 XR |

MILTON BUCHLER, *Primary Examiner.*

GEORGE E. HALVOSA, *Assistant Examiner.*